US006894234B1

(12) United States Patent
Sottong

(10) Patent No.: US 6,894,234 B1
(45) Date of Patent: May 17, 2005

(54) SEAT ADJUSTING MECHANISM

(75) Inventor: Sascha Sottong, Eckenroth (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/979,953

(22) PCT Filed: May 11, 2000

(86) PCT No.: PCT/DE00/01533

§ 371 (c)(1),
(2), (4) Date: Mar. 18, 2002

(87) PCT Pub. No.: WO00/69669

PCT Pub. Date: Nov. 23, 2000

(30) Foreign Application Priority Data

May 18, 1999 (DE) ........................................ 199 22 469
Sep. 25, 1999 (DE) ........................................ 199 46 021

(51) Int. Cl.[7] .................................................. H01H 9/00
(52) U.S. Cl. ..................... 200/5 R; 200/5 A; 200/17 R; 318/282
(58) Field of Search ................................ 200/5 R, 5 A, 200/17 A, 17 R, 18; 318/282, 286

(56) References Cited

U.S. PATENT DOCUMENTS 4,479,626 A 10/1984 Kluting et al.
4,846,529 A * 7/1989 Tulley
5,128,500 A * 7/1992 Hirschfeld
5,140,235 A 8/1992 Ahmed et al.
5,278,363 A 1/1994 Krieg et al.
5,483,853 A 1/1996 Moradell et al.
5,668,357 A * 9/1997 Takiguchi et al.
5,698,909 A * 12/1997 Miyazawa
5,813,519 A * 9/1998 Gotoh
5,866,862 A * 2/1999 Riffil et al.
6,040,533 A * 3/2000 Wagner
6,064,932 A * 5/2000 François
6,198,244 B1 3/2001 Hayden et al.

FOREIGN PATENT DOCUMENTS

DE 3632902 A1 * 9/1986
FR 2696384 10/1992
FR 2737686 8/1995
GB 2333226 7/1999
WO WO9704985 2/1997

* cited by examiner

*Primary Examiner*—Kyung Lee
(74) *Attorney, Agent, or Firm*—David P. Wood

(57) ABSTRACT

A device for controlling motor operation for adjusting a car seat using at least two switches wherein one switch is a multi-function switch and the other switch is a selector switch. The multi-function switch controls horizontal, vertical, and incline adjustments and the selector switch selects the portion of the seat to which the adjustment of the multi-function switch will be directed.

12 Claims, 2 Drawing Sheets

SEAT ADJUSTING MECHANISM

TECHNICAL FIELD

The invention generally relates to seat adjusting mechanisms, and more particularly relates to a device for controlling motors for adjusting the various parts of a seat.

BACKGROUND OF THE INVENTION

Motor vehicles, in particular, are increasingly equipped with adjustable seats that make it possible to adapt the seat to the body of a user in order to reduce fatigue while driving. Originally, it was only possible to adjust the car seat in the longitudinal direction and to adjust the incline of the back rest by means of corresponding mechanisms. Car seats developed more recently not only make it possible to realize the aforementioned adjustments, but also to vary the seat height, the incline of the seating surface, the width and the depth of the seating surface, the width of the back rest, the top section of the back rest, the headrest and the lumbar support by means of motor operators. The control of the different motor operators requires a corresponding number of electric switches that are frequently realized in the form of rocker switches and form part of a corresponding control device. This results in the problem that a driver who perceives the adjustment of the car seat as uncomfortable is distracted from the traffic when a switch needs to be selected in order to change the adjustment of the car seat while the car is driven.

A device for controlling motor operators for adjusting the various parts 2, 2$a$, 2$b$, 3, 3$a$, 3$b$, 13 of a car seat 1 is known from D1 (FR-A-2 737 686). This control device comprises several selector switches 33–37 for various switching menus of the adjustable regions of the seat parts 2, 2$a$, 3, 3$a$, 13, as well as a multi-function switch 38 for the adjusting movements 6, 7, 8, 10, 12, 15 of the respective adjustable region of the seat 1. The multi-function switch 38 is realized in the form of a push button switch that is actuated in a cruciform fashion and consequently cannot be actuated in accordance with the adjusting movements 6, 7, 8, 10, 12, 15 of the seat parts 2, 2$a$, 3, 3$a$, 13. This is the reason why this switch has relatively inferior operating comfort and this control device makes it impossible to achieve the objective of the invention. In a multi-function switch 4 that is realized in the form of a sliding rotary switch and can be actuated in a cruciform fashion, namely the multi-function switch in the control device according to the invention, the actuating direction in accordance with the double arrows 33, 34, 35 is always identical to the direction of the adjusting movements 9–19 of the respective adjustable region of the seat parts 1, 24, 25, 26, 27. Linear movements of the seat parts 1, 24, 25, 26, 27 are realized by actuating the actuating element 28 in a linear fashion, with pivoting movements of the seat parts 1, 24, 25, 36 being realized by respectively turning the actuating element 28 in the corresponding direction.

D2 (FR-A-2 696 384) also discloses a device for controlling motor operators for adjusting the various parts of a car seat 1, with said control device comprising selector switches in a field 13 and a multi-function switch 24. The multi-function switch 24 comprises individual switches 23 for adjusting the seat parts which are arranged relative to one another in a cruciform fashion, as well as an "enter" switch 24 that needs to be actuated in order to realize the adjusting movements after the individual switches 23 are actuated. The multi-function switch 24 by no means represents a sliding rotary switch that can be actuated in a cruciform fashion and to which horizontal (9, 12, 13, 15, 19) and/or vertical adjusting movements (10, 17, 18), as well as incline adjustments (11, 14, 16) for the selected adjustable region of the seat part (1, 23, 24, 25), are assigned. In this control device, the actuating directions of the individual switches 23 do not correspond to the adjusting directions of the seat parts because at least pivoting movements of the seat parts cannot be realized in the form of pivoting or rotational movements of the actuating elements of the individual switches 23.

A control device 10 with a control unit 22 for controlling motor operators for adjusting the various parts of a car seat is also known from D3 (WO 97 04985 A). The control unit 22 that is arranged in the vicinity of the steering wheel 26 of the car comprises several individual switches 38, 40, 42, 56, 58, 59 that are realized in the form of rotary switches, sliding switches or push button switches, wherein a first individual switch 56 serves for activating a stored position of the seat parts. A second individual switch 58 that is realized in the form of a selector switch selectively activates the assigned motor operators that are controlled by means of other individual switches. In order to visually illustrate the adjusting movements realized with the individual switches 38, 40, 42, 56, 58, 59, a monitor 60 with corresponding pictographs A, D, E, F1–F4 is assigned to the control unit 22. The control unit 22 with its monitor 60 has a very expensive design and comprises a relatively large number of individual switches 38, 40, 42, 56, 58, 59 that need to be operated differently.

EP 0 548 656 A1 discloses a console for electric switches in order to adjust car seats with adjustable seating surfaces and back rests, as well as extendable headrests, in a remote-controlled fashion. The switches that are realized in the form of two-way sliding contact switches are arranged in two groups that respectively serve for adjusting the seating surface on one hand and for adjusting the incline of the back rest, as well as the headrest, on the other hand. However, this division of the switches into functional groups does not reduce the number of switches required for adjusting the car seat.

DE 197 28 743 C1 discloses a device for controlling motor operators for adjusting the various parts of a car seat, wherein the adjustment of the handle elements of the operating unit which are assigned to the switches takes place in the same direction as the adjusting movement of the car seat to be realized. The handle elements of the operating unit are realized in the form of a car seat. The operating unit contains at least one handle element that can be adjusted in the corresponding directions and is integrally realized in the form of at least two seat parts, i.e., the integral handle element contains at least two handle element regions. Although this makes it possible to reduce the number of actuating elements, the number of electrical switches for the motor operators remains unchanged. In addition, the driver needs to locate the handle element region assigned to the corresponding adjustment option of the car seat from several handle element regions.

The invention is based on the objective of developing a control device of the initially described type which provides high operating comfort and in which the number of switches is simultaneously reduced.

According to the invention, this objective is attained due to the fact that one switch consists of a selector switch for different switching menus of the adjustable regions of the seat parts, and the fact that the other switch is realized in the form of a multi-function switch for realizing the adjustments of the respective regions of the seat part.

Due to these measures, the number of switches for controlling motor operators that serve for adjusting the various parts of the seat is reduced. Since only one multi-function switch is provided for realizing the adjustments and only one selector switch is provided for selecting the regions of the seat parts to be adjusted, it is not necessary to select one switch from a relatively large number of switches in order to realize the desired adjustment of the seat. Consequently, the concentration of the driver on the traffic is practically not impaired. The combination of the selector switch and the multi-function switch consequently makes it easier and faster for the user to realize the various adjustments of the seat, with the control device simultaneously providing high operating comfort. The various adjustments of the seat or the seat parts, respectively, can be controlled, for example, by means of a multiple actuation of the selector switch. In this case, the adjustments of the seat are assigned to actuating directions of the multi-function switch which always remain the same.

According to one advantageous embodiment of the invention, a first selector switch is provided for the switching menu of the entire seat, a second selector switch is provided for the switching menu of the seating surface, and a third selector switch is provided for the switching menu of the back rest. This makes it possible to specifically select the seat part to be adjusted.

In order to ensure superior comfort and an ergonomically favorable posture of the person using the seat, it is preferred to provide a fourth selector switch for the switching menu of a lumbar support. The lumbar support causes a more or less intense lordosis, i.e., a curvature of the spinal column within the lumbar region, when the back of the person using the seat is supported on the back rest.

In order to simplify the process of locating a corresponding switch of the control device, the selector switches are arranged relative to one another in accordance with the adjustable regions of the seat. The selector switches are preferably arranged relative to one another in the shape of an L, with the horizontal limb of the L-shape pointing in the direction of the multi-function switch. In this case, it is preferred that the first selector switch be arranged in the angle, the second selector switch in the horizontal limb and the third selector switch in the vertical limb of to the L-shape, with the fourth selector switch being situated in the free space between the limbs of the L-shape.

This arrangement of the selector switches symbolizes the contour of the seat such that the person using the seat is able to recognize based on the arrangement of the respective selector switch for which adjustable region the selector switch in question is intended.

In order to improve the operating comfort of the control device, each selector switch is realized in the form of a contact switch. Consequently, the selection of the desired adjustable regions of the seat part is ensured by briefly actuating the corresponding selector switch.

In order to easily recognize the selector switch itself, as well as its actuation, an actuating element of each selector switch is provided with a symbol that can be backlit by means of a locating and function light. The active selector switch consequently can be unequivocally identified due to the fact that the function light has a different color or is brighter than that of the other selector switches.

In order to simplify the ability to haptically recognize the selector switch and its assignment to the corresponding adjustable region of the seat part, the first, the second and the third selector switch are arranged in a correspondingly shaped depression of the housing, with the fourth selector switch being arranged in a separate depression. The depressions and their contours can be sensed relatively easily by means of touch.

According to another advantageous embodiment of the invention, horizontal and/or vertical adjustments, as well as incline adjustments of the selected adjustable region of the seat part, are assigned to the multi-function switch in each switching menu. The operation of the multi-function switch in each switching menu is simplified due to this uniform function. The person who intends to adjust the seat or the seat parts, respectively, will become familiar with the function of the multi-function switch after a relatively short period of time. The exact assignment of the adjusting movements to the actuating directions of the multi-function switch is ensured due to the fact that the multi-function switch is realized in the form of a sliding rotary switch that can be actuated in a cruciform fashion. The sliding rotary switch can also be simultaneously actuated in the corresponding rotating directions and sliding directions such that several adjustments of the seat or the seat parts, respectively, can take place simultaneously.

According to an advantageous additional development of the invention, incline adjustments are assigned to the opposite rotational movements of an actuating element from a zero position of the multi-function switch, and horizontal and vertical adjustments of the seat part in one or the other direction are assigned to the horizontal and vertical sliding movements of the actuating element. This means that the movements of the actuating element of the multi-function switch correspond to the adjusting movements of the selected seat part. This significantly improves the operating comfort of the control device.

In order to realize other optional adjustments of the seat parts with only one multi-function switch, the sliding rotary switch is preferably also realized in the form of a push switch or a push-pull switch. This makes it possible to realize other switching functions.

The actuating element of the multi-function switch is preferably realized in the form of a truncated cone, the large end face of which is accommodated in a cylindrical depression of a housing with a certain play, with the smaller, free end face being provided with symbols. This shape of the actuating element ensures that it can be reliably taken hold of when the multi-function switch is actuated. In addition, the depression of the housing forms a limit stop for the horizontal and vertical sliding movement of the actuating element and thusly protects the multi-function switch from damage if an excessively high force is applied.

In order to visually recognize the functions of the multi-function switch, the symbols of the actuating element of the multi-function switch preferably can be backlit by means of a locating and function light.

DETAILED DESCRIPTION OF THE PREFERRED EMBODIMENTS

Figure 1:
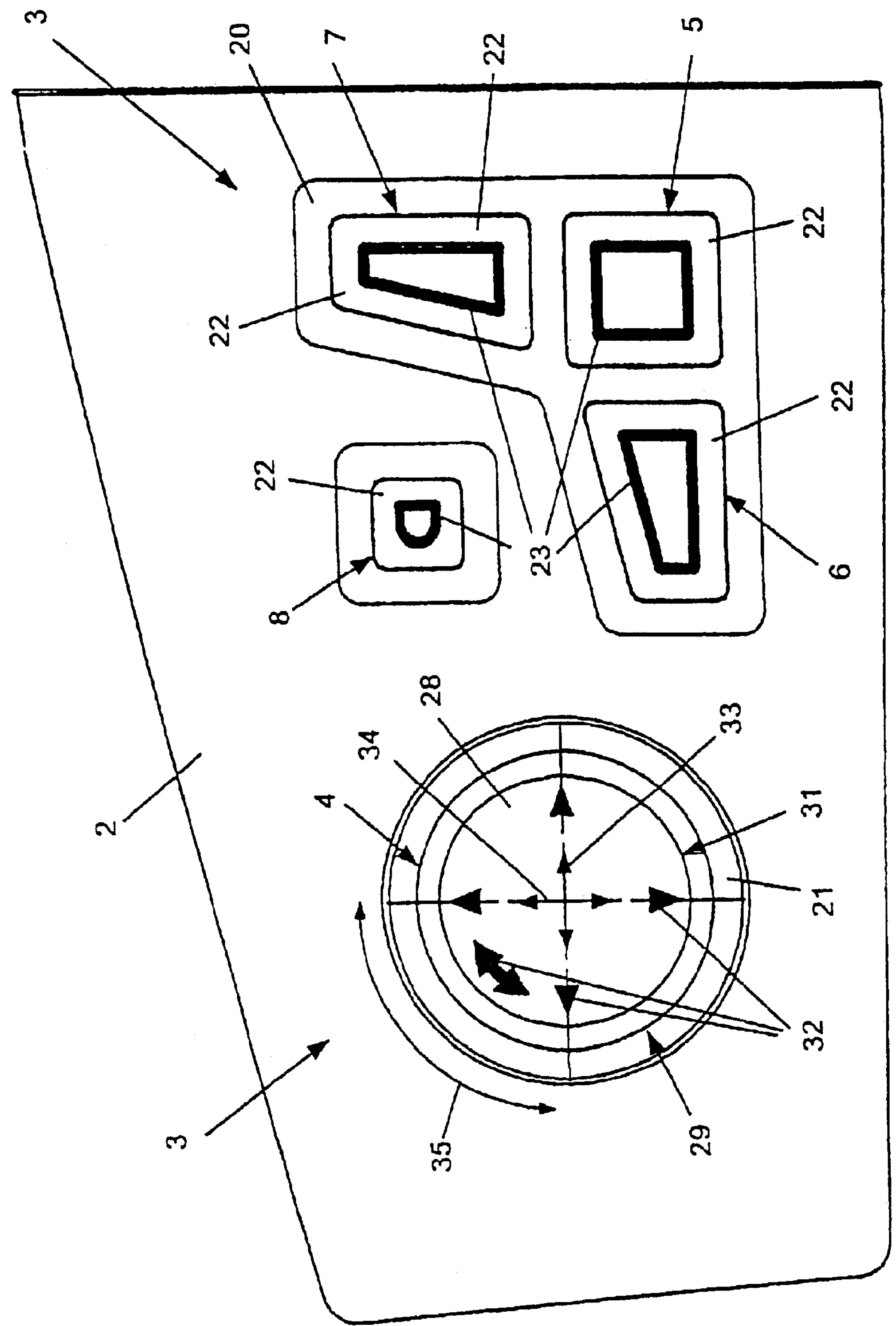
FIG. 1, a front view of a control device according to the invention.
Figure 2:
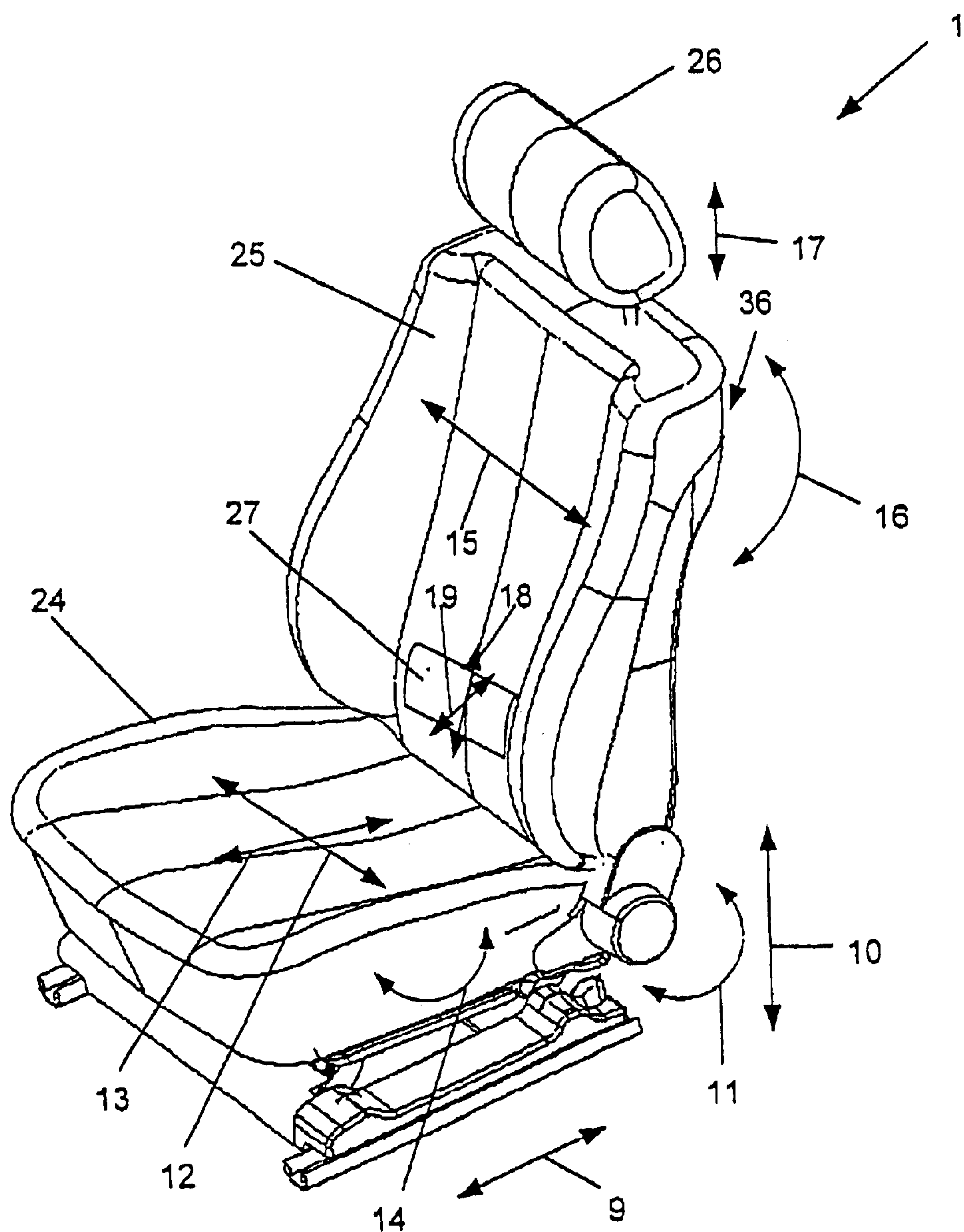
FIG. 2, a perspective representation of a car seat, the seat parts of which can be adjusted by means of the control device shown in FIG. 1.

The control device serves for adjusting a seat 1 and contains switches 3 that are arranged in a housing 2 and serve for controlling not-shown motor operators. One switch is realized in the form of a multi-function switch 4, with four additional switches being realized in the form of selector switches 5, 6, 7, 8. The switching menus for the adjustments of the respective adjustable region of the seat parts 24, 25, 26, 27 or the seat 1, respectively, which are symbolized by the double arrows 9–19 are assigned to the multi-function switch 4 that is realized in the form of a sliding rotary switch and can be actuated in a cruciform fashion.

The selector switches 5., 6, 7 are arranged in the shape of a L, with the first selector switch 5 being arranged in the angle, the second selector switch 6 being arranged in the horizontal limb and the third selector switch 7 being arranged in the vertical limb, namely in a common depression 20 of the housing 2. The fourth selector switch 8 is situated in the free space between the limbs of the L-shape and accommodated in a separate depression of the housing. The actuating elements 22 of the selector switches 5, 6, 7, 8 that are realized in the form of contact switches are provided with symbols 23 that can be backlit by means of a not-shown locating and function light.

In order to correspondingly assign the selector switches 5, 6, 7, 8 to the respective switching menu of the adjustable regions of the seat parts, the first selector switch 5 is provided for the switching menu of the entire seat 1, the second selector switch 6 is provided for the switching menu of the seating surface 24, the third selector switch 7 is provided for the switching menu of the back rest 25 with its headrest 26, and the fourth selector switch 8 is provided for the switching menu of a lumbar support 27 that is integrated into the back rest.

An actuating element 28 of the multi-function switch 4 which has the shape of a truncated cone is accommodated with a certain play in a depression 30 of the housing 2 with its large end face 29. The small end face 31 of the actuating element 28 is provided with symbols 32 that can be backlit by means of a locating and function light. The actuating element 28 can be displaced in a cruciform fashion as indicated by the double arrows 33, 34 and turned in accordance with the double arrow 35. These actuating movements take place from a zero position, into which the actuating element automatically returns.

The function of the control device is described in greater detail below. A vertical adjustment 9 of the entire seat 1 takes place in the corresponding direction when the first selector switch 5 is actuated and the actuating element 28 of the multi-function switch 4 is horizontally displaced in one of the directions indicated by the double arrow 33. The height 10 of the seat 1 is adjusted by displacing the actuating element 28 in one of the directions indicated by the double arrow 34. The incline 11 of the back rest 25 is adjusted by turning the actuating element 28 in accordance with the double arrow 35. Once released, the actuating element 28 of the multi-function switch 4 automatically returns into its zero position and the adjusted seat part 1, 24, 25, 26, 27 remains in its position.

The switching menu of the seating surface 24 is selected by actuating the second selector switch 6. The seat depth 13 is increased or decreased by correspondingly displacing the actuating element 28 of the multi-function switch 4 in accordance with the double arrow 33, with the width of the seating surface 24 being adjusted in accordance with the double arrow 12 when the actuating element 28 is displaced in accordance with the double arrow 34. The incline 14 of the seating surface 24 is adjusted by correspondingly turning the actuating element 28 in one of the directions indicated by the double arrow 35.

The switching menu of the back rest 25 is selected by depressing the actuating element 22 of the third selector switch 7. The width of the back rest 25 adjusted in accordance with the double arrow 15 by displacing the actuating element 28 of the multi-function switch 4 in accordance with the double arrow 33. In addition, the incline 16 of the upper section 36 of the back rest can be adjusted by turning the actuating element 28 in accordance with the double arrow 35. The height 17 of the headrest 25 is adjusted by moving the actuating element 28 in one of the directions indicated by the double arrow 34.

The switching menu for the lumbar support 27 is selected by actuating the fourth selector switch 8. The depth of the lumbar support can be adjusted in accordance with the double arrow 19 by displacing the actuating element 28 of the multi-function switch 4 in accordance with the double arrow 33 or 34 or the height of the lumbar support can be adjusted in accordance with the double arrow 18. Since the incline of the lumbar support 27 is not adjustable, the height adjustment indicated by the double arrow 18 is assigned to the rotational movement of the actuating element 28 in accordance with the double arrow 35.

What is claimed is:

1. Device for controlling motor operators for adjusting the various parts of a seat, comprising:

a first selector switch means for selecting different menus of an adjustable region of seat parts, a second multi-function switch means for adjusting the respective adjustable regions of the seat part, wherein the multi-function switch is realized in the form of a sliding rotary switch that is actuated in a cruciform fashion, wherein the horizontal and vertical adjustments, as well as incline adjustments for the selected adjustable region of the seat part, are assigned to the multi-function switch in each menu of the selector switch.

2. Control device according to claim 1, wherein said first selector switch means includes a first selector switch for the switching menu of the entire seat, a second selector switch for the switching menu of the seating surface, a third selector switch for the switching menu of the back rest.

3. Control device according to claim 2, further including a fourth selector switch is provided for the switching menu of a lumbar support.

4. Control device according to claim 3, wherein the first selector switch is arranged in the angle, wherein the second selector switch is arranged in the horizontal limb, and wherein the third selector switch is arranged in the vertical limb of the L-shape, with the fourth selector switch lying in the free space between the limbs of the L-shape.

5. Control device according to claim 3, wherein each selector switch is realized in the form of a contact switch.

6. Control device according to claim 3, wherein the first, the second and the third selector switch are arranged in a correspondingly shaped depression of a housing, and wherein the fourth selector switch is arranged in a separate depression of the housing.

7. Control device according to claim 6, wherein incline adjustments are assigned to the opposite rotational movements of at least one actuating element from a zero position of the multi-function switch, and by the fact that horizontal and vertical adjustments of the seat part in one direction are assigned to the horizontal and the vertical sliding movement of the actuating element.

8. Control device according to claim 6, wherein the actuating element of the multi-function switch is realized in the form of a truncated cone, a large end face of which is arranged in a cylindrical depression of the housing with a certain play, with its smaller free interface being provided with symbols.

9. Control device according to claim 8, wherein the symbols of the actuating element of the multi-function switch are backlit by means of a locating and function light.

10. Control device according to claim 2, wherein the first, second, and third selector switches are arranged relative to one another in accordance with the adjustable regions of the seat.

11. Control device according to claim 2, wherein the first, second, and third selector switches are arranged relative to one another in the shape of an L, with the horizontal limb of the L-shape pointing in the direction of the multi-function switch means.

12. Control device according to claim 2, wherein each switch includes a respectively associated actuating element, wherein each actuating element is provided with a symbol that is backlit by means of a locating and function light.

* * * * *